United States Patent [19]

Chen et al.

[11] Patent Number: 5,699,105
[45] Date of Patent: Dec. 16, 1997

[54] CURBSIDE CIRCUITRY FOR INTERACTIVE COMMUNICATION SERVICES

[75] Inventors: Howard Zehua Chen, Berkeley Heights; Michael Gunnar Johnson, Hopatcong; King Lien Tai, Berkeley Heights, all of N.J.

[73] Assignee: Lucent Technologies Inc., Murray Hill, N.J.

[21] Appl. No.: 534,909

[22] Filed: Sep. 28, 1995

[51] Int. Cl.$^6$ ................................................ H04N 7/173
[52] U.S. Cl. .......................... 348/7; 348/13; 348/6; 455/5.1; 455/4.2
[58] Field of Search ..................... 348/7, 6, 12, 13, 348/10, 11; 455/4.2, 5.1, 4.1, 6.1, 6.2, 6.3; 358/84, 86; H04N 7/16, 7/173, 7/10

[56] References Cited

U.S. PATENT DOCUMENTS

| | | | |
|---|---|---|---|
| 4,538,174 | 8/1985 | Gargini et al. | 348/7 |
| 4,574,305 | 3/1986 | Campbell et al. | 348/12 |
| 4,673,976 | 6/1987 | Wreford-Howard | 348/12 |
| 4,792,848 | 12/1988 | Nussrallah et al. | 348/3 |
| 4,994,909 | 2/1991 | Graves et al. | 348/12 |
| 5,289,271 | 2/1994 | Watson | 348/1 |
| 5,319,455 | 6/1994 | Hoarty et al. | 348/7 |
| 5,387,927 | 2/1995 | Look et al. | 348/7 |
| 5,440,335 | 8/1995 | Beveridge | 348/12 |
| 5,481,757 | 1/1996 | Mihara et al. | 348/12 |
| 5,528,582 | 6/1996 | Bodeep et al. | 370/24 |

OTHER PUBLICATIONS

R. Richard Jones, "Baseband and Passband Transport Systems for Interactive Video Services," IEEE Communications Magazine, pp. 90–101 (May 1994).

Primary Examiner—John K. Peng
Assistant Examiner—Chris Grant
Attorney, Agent, or Firm—David I. Caplan

[57] ABSTRACT

Only one or only a few channels are sent at a time from circuitry located in a curbside box, via a link such as either a coaxial or a fiber cable, into a customer's home TV set or personal computer. However, many more than a few channels are delivered to the curbside box, via a link such as a fiber or a coaxial cable, from a central office or a central bank of paid video-movies to be selected by the customers. Thus whereas the link from the central office or central bank is relatively broad-band (e.g. 500 MHz to 1,000 MHz), the cable from the curbside to the home (or any other kind of building) can be relatively narrow-band (e.g., 5 MHz to 50 MHz). The curbside box serves a multitude of homes—a separate (narrow-band) cable running to each home from the (same) curbside switch. Each channel can be a free radio or free TV channel, a stored or an on-line newspaper pay channel, or a pay TV channel, or a pay-per-view channel (i.e., the customer must give advance notice per view, and may begin viewing in the middle of a selected program, or may come in at the beginning of a selected program with a short delay, depending on the sender's arrangement). Requests from each TV set in each home (e.g., initiated by means of a hand-held remote control infra-red sending device) can be sent to the curbside box from the home along a link such as a wire or along the same curbside-to-home cable itself. In addition, billing of customers can be accomplished by means of another link connecting a junction in the wire or in the curbside-to-home cable to one or more remote billing centers.

14 Claims, 1 Drawing Sheet

CURBSIDE CIRCUITRY FOR INTERACTIVE COMMUNICATION SERVICES

FIELD OF THE INVENTION

This invention relates to methods of delivering communication services to consumers ("customers"), and more specifically to methods of delivering interactive information services—such as video, voice, data, and multimedia services—to consumers located in such places as homes or other buildings. As used herein, the term "interactive" refers to situations in which a person (e.g., the customer) can control the information being sent on an on-going or other basis.

BACKGROUND OF THE INVENTION

The present method of billing used by cable television ("TV") suppliers is to charge each customer a flat monthly ram, regardless of which channels the customer has watched or for how long. By contrast, telephone calls are billed on a pay-per-call basis.

In addition, present methods of billing used by cable TV operators are vulnerable to rampant illegal descrambling (using commercially available descramblers), because a wideband signal containing a multitude of scrambled channels is sent to the home (albeit together with noise) via a coaxial cable that the customer can access.

Moreover, in prior art, pay-per-view systems for cable TV delivery and billing suffer from the added problem that, in addition to the illegal descrambling problem, these systems do not work in real time—the customer must know in advance when a desired video program will be shown and must make a telephone call (in advance of a desired viewing) to the provider of the video program: the telephone call can be made, for example, via a separate telephone network.

In the prior art, also, set-top-box systems are known for the purpose of delivering interactive video services to the home. These systems are designed to accommodate data-compressed digital video signals that must be decoded in the set-top-box before these signals can be displayed on a TV set. At present this set-top-box approach is designed for the delivery of only a single-channel, data-compressed digital video signal, and it does not provide for delivery of existing analog cable TV signals or any other type of information.

Another factor to be considered is that Federal Communications Commission regulations concerning cable-service to the home presently require that a cable-service provider must carry a multitude of channels including free broadcast TV channels (the "must-carry" clause of the regulations). A pay-per-view system (typically analog) that uses existing copper wires to-the-home is undesirably bandwidth-constrained, whereas a pay-per-view system that uses a dedicated frequency band in existing coaxial cable to-the-home is expensive: it is therefore not feasible for either of these pay-per-view systems to carry free broadcast channels. There is thus a need for a single system that enables the coexistence of real-time pay-per-view (for analog channels) and of both free and paid broadcast channels In addition, it would be desirable that the system be capable of handling the transmission of digital data to the customer on a paid basis.

Another issue involved here is keeping track of channel usage by each customer. To this end, U.S. Pat. No. 5,289,271 teaches obtaining information concerning channel usage by each customer (billing information) by means of a cable-usage box. The cable-usage box includes circuitry that monitors the microwave carriers being transmitted to the customer. In this way, the technique senses the presence of a specific analog TV channel being used by the customer. This technique, however, has disadvantages such as those stemming from the need of momentary interruptions of transmission to the customer. In the case of analog TV signals, such interruptions of transmission can be very annoying to the customer. In the case of digital signals, such interruptions can cause loss of unacceptably large amounts of digital information (for example an entire file), especially in cases in which the digital information is being set in packets with headers or trailers, or both headers and trailers. Therefore it also would be desirable to have a billing subsystem that does not suffer from these disadvantages.

SUMMARY OF THE INVENTION

This invention satisfies the above-mentioned need for a single system—capable of accommodating both free and pay channels, the channels being capable of transmitting both analog and digital signals—and can mitigate one or more of the foregoing disadvantages of prior art. More specifically, the invention provides an interactive system that can control the delivery of information from a neighborhood information source to the home (or other local place such as any other kind of building) in real-time. Hereinafter a neighborhood information source will be referred to as "curbside switch-box circuitry" or simply a "curbside box". Typically, a curbside box is located underneath or overlying a street in the neighborhood of a group of homes. The curbside box is adapted or connected (or both adapted and connected) to receive information from a multitude of remote sources of signals. These remote sources send their respective information to the curbside box via such means as analog cable TV cables, connectors ("links") from satellite communication receivers, links from local video rental stores, links from remote video servers operated by telephone companies, links from newspaper and yellow page services, and any other links such as Internet information service links. Each of the links can carry channel(s) that can be either free broadcast channels, paid broadcast channels, pay-per-use channel(s), pay-per-hour channel(s), or pay-per-view channel(s). Such channels can be multimedia.

Typically, a single curbside box is connected to, and thus serves, a multitude of consumers, each program being selected for and by each consumer. The curbside box contains information derived from the information services supplied by the remote sources. Each consumer can select any one of the multitude of channels at any moment of time, such as by means of an infrared remote-control device that is presently used to control the programs being displayed on TV sets, video cassette recorders ("VCRs"; video tape players), and the like. Each of the channels typically carries a "program" or other form of information. The infrared remote-control device sends a coded infrared request signal to a novel set-top box advantageously located in close proximity to the TV set whose programs the set-top box controls. This set-top box thus receives and then sends ("transponds") a resulting coded request signal via a link to a remote control receiver (hereinafter: "Remote Controller") located in the curbside box. The Remote Controller decodes each such request signal, in order to produce a decoded signal that selects which of the channels is to be sent to the home. The resulting selected channel is then sent to the house over a single fiber or coaxial cable. Moreover, in case of selection of a paid channel, the Remote Controller can also send billing information to an appropriate remote billing location, such as a remote billing center.

In prior art, a conventional set-top-box contains a Motion Picture Experts Group ("MPEG") decoder, and it performs complex digital signal processing and thus is essentially a personal computer contained in a set-top-box. Therefore, the circuitry of the set-top box of the present invention is simpler than that of the conventional set-top-box.

The entire interactive communication system of this invention thus does not favor any type of service (free or paid): the inventive system simply sends the requested information to the home. Moreover, the system does not allow the consumer to gain access to a channel without preventing the information that the consumer has thus gained accessed to the channel ("billing information") from automatically being sent, together with the request signal, to the appropriate remote billing location ("billing center") via a link ("billing link") that carries this billing information to the appropriate billing center. Either this billing link is inaccessible to the customer, or its location is unknown to the consumer, or the link is both inaccessible (with respect to the customer) and has an unknown location (with respect to the customer). Hence, the consumer cannot prevent the billing information from being sent to the appropriate remote billing center.

In a specific embodiment, this invention involves an interactive communication system including curbside switch-box circuitry, the curbside switch-box circuitry located in a curbside box, the curbside switch-box circuitry comprising:

(a) a converter arranged to receive a first plurality of channels from at least a first remote location;

(b) a remote controller connected to receive a set of first signals delivered to the remote controller via each of a first set of first links, the remote controller being arranged to deliver controller signals to the converter, in response to the set of first signals, to enable the converter to select from among the first plurality of channels, which of the channels is or are delivered, via each of second set of second links, to each of one or more viewing devices, at least one of such viewing devices being located in at least a separate one of a set of buildings. The set of first signals typically is generated by the customers.

Advantageously, the curbside switch-box circuitry further comprises a data storage and switching device circuitry, the data storage and switching device circuitry comprising data-storage-and-switching circuitry arranged to receive a third plurality of channels from at least a second remote location. In such a case, the data storage and switching device circuitry, the remote controller, and the converter are arranged to enable the converter in response to the set of first signals to select, from among the third plurality of channels, which of the channels of the third plurality is or are delivered via the second set of second links to the one or more viewing devices in response to the set of first signals.

Advantageously the first remote source can be a cable TV source of both pay TV and free TV channels. The second remote source can be a video bank of paid channels such as pay-per-view video programs.

The data storage and switching device can either switch data, being received on the third plurality of channels, directly to the converter in response to the set of first signals, or can store these data and subsequently deliver these data to the converter in response to the set of first signals, or can both directly switch some of these data and store other of these data and subsequently deliver any of these data to the converter in response to the set of first signals—and the converter will then deliver the resulting switched or stored data to the customers via the set of second links.

Any first and second links of the first and second sets can be optical fibers or coaxial cables, whereby these first and second links can be a single optical fiber or a single coaxial cable that carries signals in two directions—one direction from curbside box to the home, the other direction from the home to the curbside box. In the case of the coaxial cable, such a consolidation into a single cable is advantageously subject to the proviso that the circuitry of the system is arranged so that the curbside box does not send signals to the customer at the same time that the customer sends signals to the curbside box.

Advantageously, the system further comprises a third set of third links, each of the links in the third set having a separate junction with a separate one of the links in the first set, and each of the links in the third set arranged to carry signals from the junction to an appropriate billing center. The locations of these junctions are either unknown to the customers, or are inaccessible to the customers, or both are unknown to and are inaccessible to the customers—whereby the customers cannot prevent the billing information from being sent to appropriate remote billing center(s).

DETAILED DESCRIPTION

Figure 1:
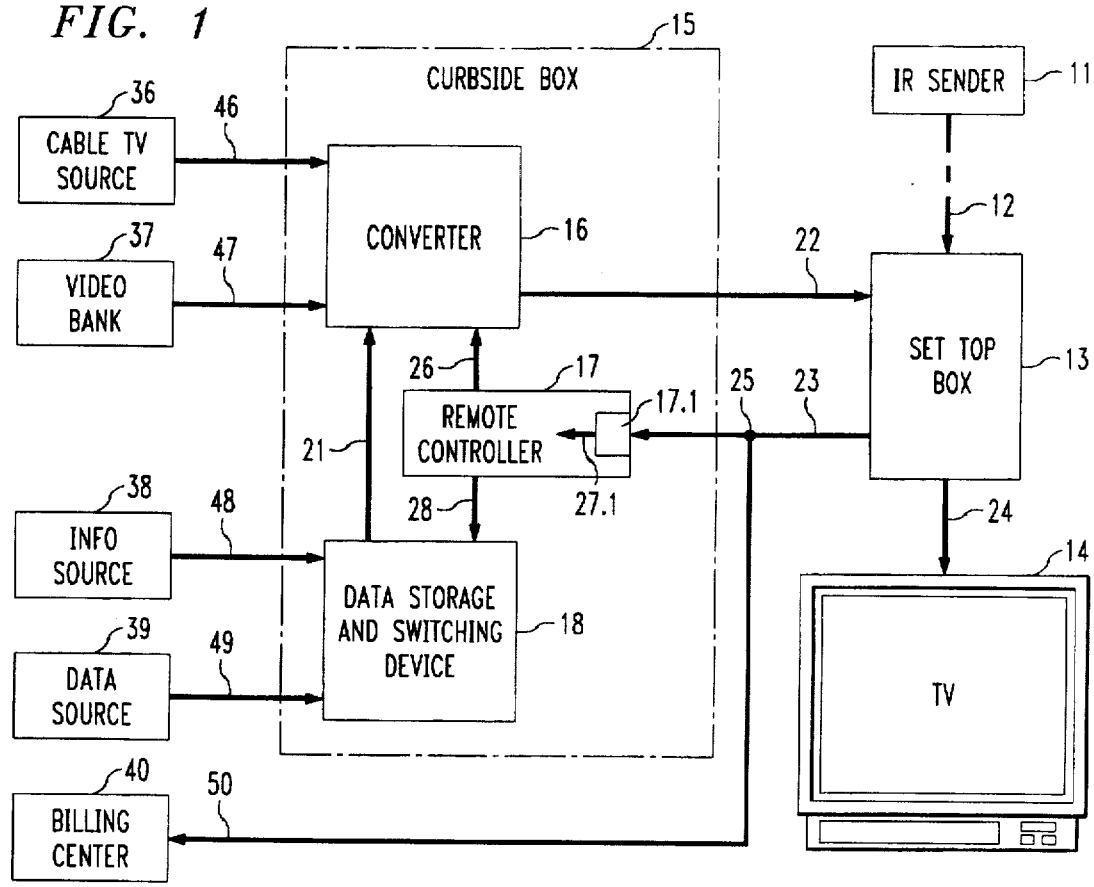
FIG. 1 is a block diagram of an interactive video system in accordance with an specific embodiment of the invention.

As shown in FIG. 1, a hand-held remote infrared sending device 11 (denoted "IR sender" in the drawing) sends a coded infrared request signal 12 to a set-top box 13. Advantageously the set-top box 13 is located in close proximity to a viewing device 14 (denoted "TV" in the drawing) whose programs the set-top box 13 controls. As explained more fully below, this viewing device 14 can be, for example, a TV set, a video cassette recorder (commonly known as a "VCR"), or a personal computer—depending upon the nature of the program that the consumer wishes to view.

The set-top box 13 is connected via a link 23 to a remote controller 17 located in the curbside box 15. In response to the coded signal 12, the set-top box is arranged to send a coded request signal via the link 23 to a receiver-decoder 17.1. This receiver-decoder 17.1 is arranged to convert the coded signal coming from the set-top box 13 via the link 23 into a decoded signal 27.1 that a remote controller 17 can process.

Typically the link 23 is an optical fiber. However, the link 23 can be a coaxial cable. Alternatively, it can be a twisted wire pair provided that the set-top box 13 contains a device that converts the coded infrared signal 12 into a coded electrical signal, as known in the art.

The operations of the infrared sending device 11 and the receiver-decoder 17.1 can be based on known methods of modulating an infrared subcarrier by means of ON-OFF coding ("ON-OFF Keying" or "Amplitude Shift Keying"). In this method, the intensity of the infrared light beam is modulated by a low frequency subcarrier (typically, 30–80 kHz, but the range can be easily extended) in an ON-OFF manner. As a result, several (typically, five) infrared remote control links can be used in the same home without mutual interference. Thus, in a single home, several different hand-held remote control devices can be used, each for controlling a separate TV set and each using a different infrared subcarrier frequency, to enable more simultaneous users in the same home, each user controlling a separate viewing device 14.

A converter 16 is arranged to receive signals on links 46 and 47 coming from remote sources 36 and 37, respectively. For example, as indicated in FIG. 1, the remote source 36 can be a cable TV source (of both free and pay TV channels) and the remote source 37 can be a video bank (e.g., a source of pay-per-view video programs). Each of the links 46 and 47 can carry a multitude of respective channels on a respective multitude of carrier waves.

In response to the decoded signal 27.1 developed by the receiver-decoder 17.1, the remote controller 17 is arranged to develop a processed signal 26 that is delivered to the converter 16. In response to this processed signal 26, the converter 16 is arranged to send the customer-selected (customer-requested) channel (information) to the home via a link 22, typically a coaxial cable or an optical fiber. More specifically, typically the link 22 delivers the information from the converter 16 to the home to the set-top box 13 on a carrier having a frequency equal to that of the conventional TV channel 3 or 4. The set-top box 13 is arranged to deliver this information to the viewing device 14 via a link 24. In case the links 22 and 23 are optical fibers, they can be consolidated into a single fiber, as known in the art. Likewise, in case the links 22 and 23 are coaxial cables, they can be consolidated into a single cable, as known in the art, provided that the circuitry of the system is arranged so that the curbside box does not send signals to the customer at the same time that the customer sends signals to the customer.

Figure 2:
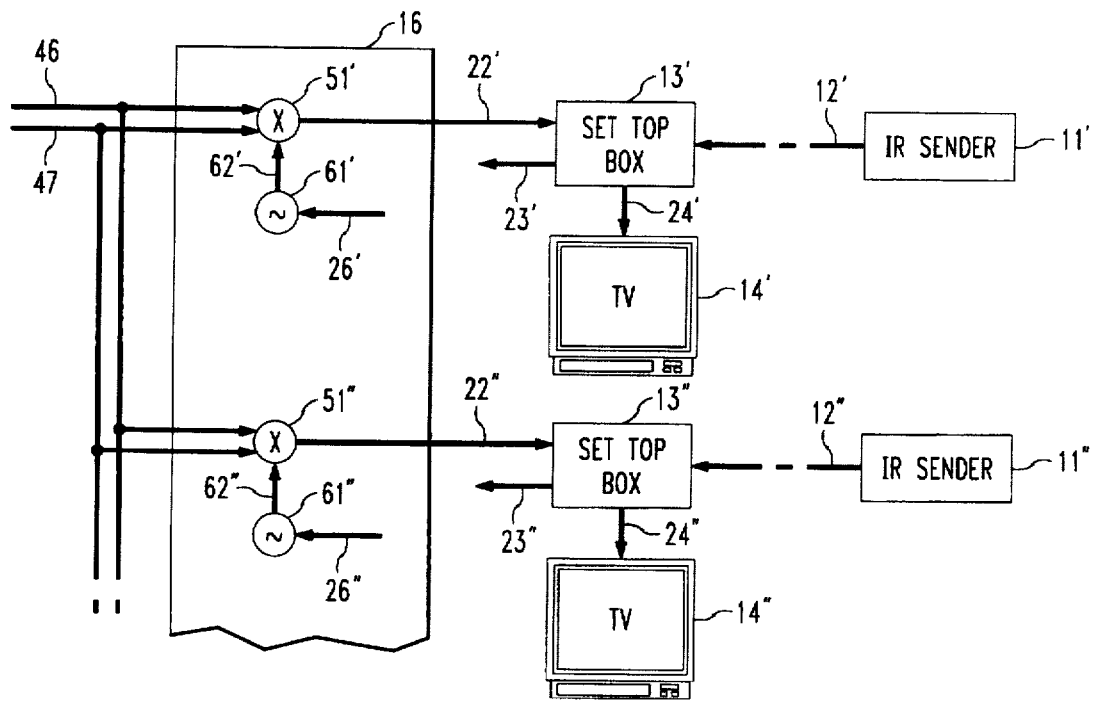
FIG. 2 is a diagram of a portion of FIG. 1 in accordance with an exemplary embodiment of the invention.

For viewing cable TV signals, the device 14 typically is a TV set or a VCR located in the home, and the Converter 16 sends only a single channel to the TV or VCR, typically via the set-top box 13, on a carrier having the frequency equal to that of the conventional TV channel 3 or channel 4, as further described below in an exemplary embodiment (FIG. 2). For other digital information, the viewing device 14 typically is a digital information receiver device, such as a personal computer including a monitor, in which case the converter 16 sends a digital signal to this device 14 via to the set-top box 13.

The invention is also useful for receiving, in the home, other forms of information, including on-line information such as Internet based services, sent to a personal computer that functions as the viewing device 14. For this purpose, a remote source 38 of such information (denoted "information source" in the drawing) is arranged to send this information via link 48 to the data storage & switching device circuitry 18. Further, in response to a decoded signal 28 developed by the remote controller 17 (in turn, ultimately in response to the signal on the link 23 from the set-top box 13 located in the home), the data storage & switching device circuitry 18 is arranged to switch the customer-requested on-line information to the converter 16, for delivery to the set-top box 13 in the home, using known methods. Such known methods include, for example, digital circuitry comprising buffering and timing circuitry typically located in the converter 16 or in the data & switching device 18, or partly in both the converter 16 and the data & switching device 18. In such cases, the set top box 13 can be omitted, and the requested and requesting information can be sent directly to and from the personal computer over the links 22 and 23, respectively.

The invention is further useful for viewing other forms of data—such as yellow-page data, newspapers, periodicals, and the like—that are stored in a data storage & switching device circuitry 18 located in the curbside box 15. In such cases, a remote data source 39 sends such data on link 49 to the data storage & switching device circuitry 18, for delivery to the converter 16 in response to the customer's request on the link 23. The converter 16 then delivers the customer-requested information to the home via the link 22.

The links 46, 47, 48, 49 and 50 can include optical fibers, coaxial cables, and other forms of remote transmission such as wireless (electromagnetic waves in space), as known in the art. Typically, whereas the link 46, 47, 48, and 49 are relatively broad-band (for example, 500 MHz to 1,000 MHz), the link 22 from the curbside box 15-can be relatively narrow-band (for example, 5 MHz to 50 MHz). Also, the remote sources 36, 37, 38, and 39 typically are located many kilometers from the curbside box 15.

FIG. 2 shows a portion of the converter 16 in accordance with an exemplary embodiment. This portion shows how the converter 16 can accommodate a multiplicity of different homes. The reference-symbol-notation in FIG. 2 uses a single prime (') for denoting elements located in the first home, a double prime (") for denoting elements located in the second home, and so forth. In each of the homes is located an infrared remote sending device 11', 11", . . . each of which send a coded signal 12', 12", . . . to a separate set-top box 13', 13", . . . . . Advantageously, each of these set-top boxes is located in close proximity to a separate viewing device 14', 14", respectively, . . . whose respective programs each of the set-top boxes 13', 13", . . . controls. Each of the settop boxes 13', 13", . . . sends a respective coded request signal via the respective links 23', 23" . . . to the receiver-decoder 17.1 (FIG. 1) of the remote controller 17. In response thereto, the remote controller 17 processes these request signals and sends the resulting respective processed signals 26', 26", . . . , to local oscillators 61', 61", . . . , respectively, located in the converter 16. In response to these processed signals, the instantaneous operating frequency f', f", . . . , of each of the local oscillators 61', 61", . . . , respectively, is controlled, as is understood in the art. The local oscillators 61', 61", . . . , are arranged to send respective sinusoidal signals 62', 62", . . . ,-having frequencies equal to each of these respective frequencies f', f", . . . ,-to mixers 51', 51", . . . , respectively. In response, each of the mixers 51', 51", . . . , thus selects which of the channels on which one of the links 46 or 47 is sent via links 22', 22", . . . , to the respective set-top boxes 13', 13", . . . . In response, each of the set-top boxes 13', 13", . . . , respectively, is arranged to send the respective customer-selected channels via each of respective links 24', 24", . . . , to each of the respective viewing devices 14', 14', . . . , (i.e., to each of the customers).

In order to provide capability of billing the customers, each of the links 23 has a junction 25 at which a link 50 splits off and is connected to a remote billing center 40 at which the fact that the customer has requested access is recorded for billing purposes. Advantageously, the junction 25 is located in a place that is either inaccessible or unknown to the customer or is both inaccessible and unknown to the customer. For example, the junction 25 can be located inside the curbside box 15 or can be buried somewhere in the street outside the buildings at a location outside the curbside box 15. Typically the remote billing center 40 is located many kilometers from the curbside box 15.

Although the invention has been described in detail with reference to a specific embodiment, various modifications can be made without departing from the scope of the invention. For example, instead of a single remote billing center 40, there can be more than just one such remote billing center 40 and hence more than just one such link 50 connecting each such billing center 40 with the junction 25. In this way, coded billing information is sent directly to each billing center 40, and each billing center has a decoder that can understand (i.e., decode) only the billing information pertaining to that particular billing center. Moreover, any of the remote billing centers can be located at any of the remote sources.

What is claimed is:

1. An interactive communication system including a curbside switch-box, the curbside switch-box comprising:

a converter which receives a plurality of channels from at least one first remote source;

a remote controller which receives a set of first signals from a set of first links and delivers controller signals to the converter in response to the set of first signals, the controller signals enabling the converter to select channels from the plurality of channels, wherein the converter delivers the selected channels via a set of second links to a plurality of viewing devices; and a data storage and switching device which receives data from at least one second remote source, wherein the remote controller, in response to the set of first signals, enables the data storage and switching device and the converter to deliver selected data from the second remote source via the set of second links to the plurality of viewing devices.

2. The system of claim 1, wherein at least one of the first links is a pair of wires.

3. The system of claim 1, wherein at least one of the first links and one of the second links is a single coaxial cable.

4. The system of claim 1, wherein at least one of the second links is a coaxial cable.

5. The system of claim 1, wherein at least one of the first links and one of the second links is a single optical fiber.

6. The system of claim 1, further including a set of third links which connects the set of first links with a remote billing location.

7. The system of claim 1, further including a plurality of set-top boxes located in a plurality of locations, wherein each set-top box is connected to one of the first links and one of the second links.

8. The system of claim 1, wherein the remote controller, in response to the set of first signals, controls the data storage and switching device to switch between the at least one second remote source to deliver data to the converter from the selected second remote source.

9. The system of claim 1, wherein the data storage and switching device stores data received from the at least one second remote source and delivers at least some of the stored data to the converter in response to data controller signals developed by the remote controller in response to the set of first signals.

10. The system of claim 11, further including a set of third links connecting the set of first links with a remote billing location.

11. The system of claim 1, wherein the at least one first remote source is a cable television source.

12. The system of claim 1, wherein the at least one first remote source is a video bank.

13. The system of claim 1, wherein the at least one second remote source is an information source.

14. The system of claim 1, wherein the at least one second remote source is a data source.

* * * * *